United States Patent [19]

Kawano et al.

[11] Patent Number: 5,001,520
[45] Date of Patent: Mar. 19, 1991

[54] DOCUMENT CONVEYANCE APPARATUS WITH RETRACTABLE AUXILIARY CONVEYANCE ROLLER

[75] Inventors: Minoru Kawano, Hino; Kazushige Murata, Hachioji; Kazunobu Miura, Hino; Mitsuru Nagoshi, Hachioji, all of Japan

[73] Assignee: Konica Corporation, Tokyo, Japan

[21] Appl. No.: 426,003

[22] Filed: Oct. 24, 1989

[30] Foreign Application Priority Data

Oct. 26, 1988 [JP] Japan .................................. 63-2716661
Nov. 29, 1988 [JP] Japan .................................. 63-302594

[51] Int. Cl.$^5$ .......................................... G03G 21/00
[52] U.S. Cl. .................................... 355/308; 271/227; 271/233
[58] Field of Search ................ 271/227, 233; 355/230, 355/231, 75, 76, 308

[56] References Cited

U.S. PATENT DOCUMENTS

| | | | |
|---|---|---|---|
| 4,110,038 | 8/1978 | Irvine et al. | 355/231 X |
| 4,285,512 | 8/1981 | Shlatz | 355/230 X |
| 4,428,667 | 1/1984 | Phelps et al. | 355/75 X |
| 4,607,835 | 8/1986 | Wilson et al. | 271/227 |
| 4,739,983 | 4/1988 | Ide et al. | 271/233 |

FOREIGN PATENT DOCUMENTS 030646 6/1981 European Pat. Off. .
102202 3/1984 European Pat. Off. .
145045 6/1985 European Pat. Off. .

Primary Examiner—A. T. Grimley
Assistant Examiner—William J. Royer
Attorney, Agent, or Firm—Finnegan, Henderson, Farabow, Garrett, and Dunner

[57] ABSTRACT

A document conveyer for conveying a document to a predetermined position on platen glass of a copying machine, including; a document feeder for feeding the document from the outside of the document conveyer to a conveyance roller, located on the platen glass the conveyance roller, for conveying the document onto the platen glass by rotating in the forward direction, and also for subsequently bringing the trailing edge of the document into contact with an edge setting member, located adjacent to the platen glass, by rotating in the reverse direction so that the document is set at the predetermined position on the platen glass, an auxiliary conveyance roller, located on the platen glass, for conveying the document onto the platen glass by functioning with the conveyance roller when the document is longer than a predetermined size, and a roller retractor for retracting the auxiliary conveyance roller from the platen glass so that the auxiliary conveyance roller does not convey the document, in which the auxiliary conveyance roller is retracted from the platen glass by the roller retractor while the document is being brought into contract with the setting edge member by the conveyance roller.

4 Claims, 18 Drawing Sheets

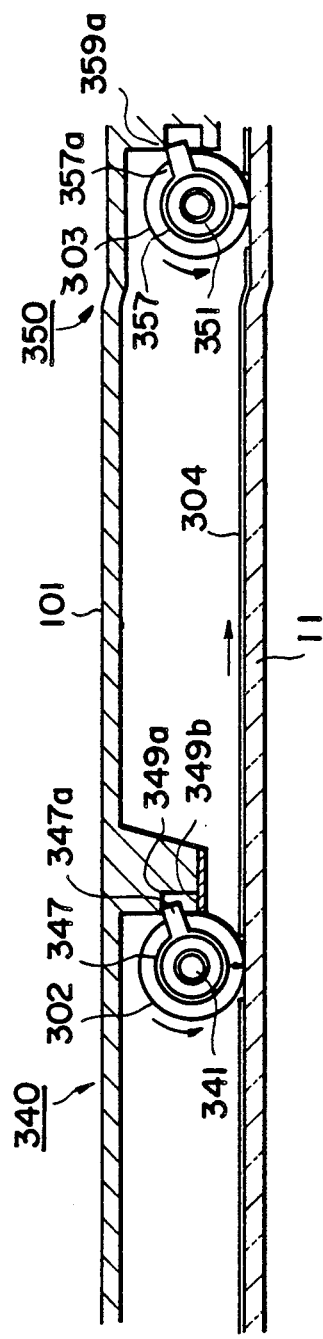
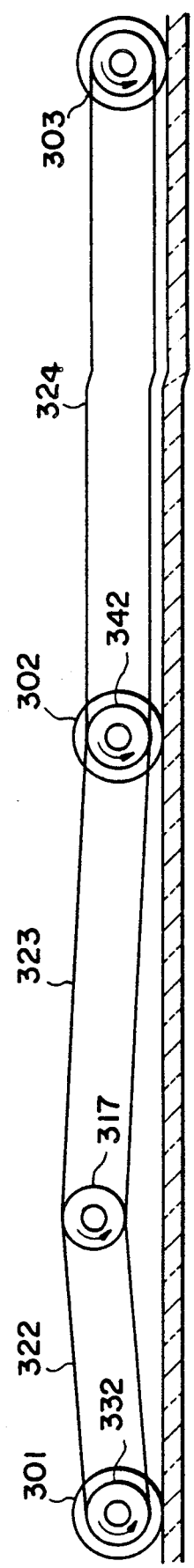

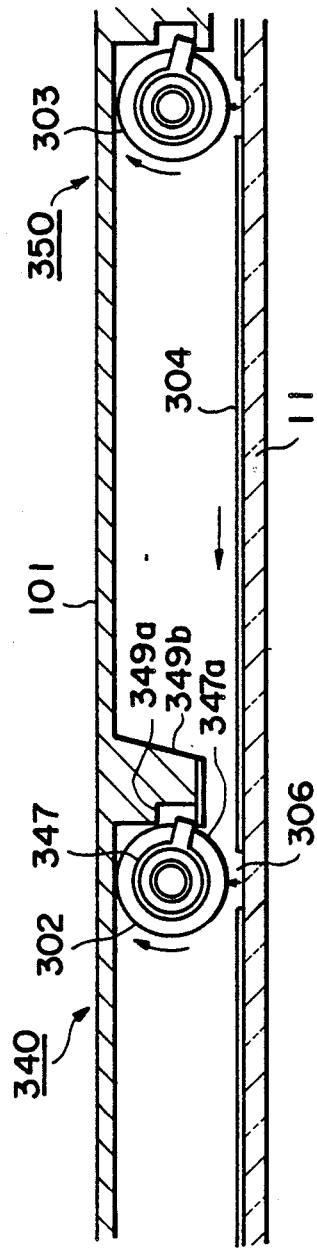
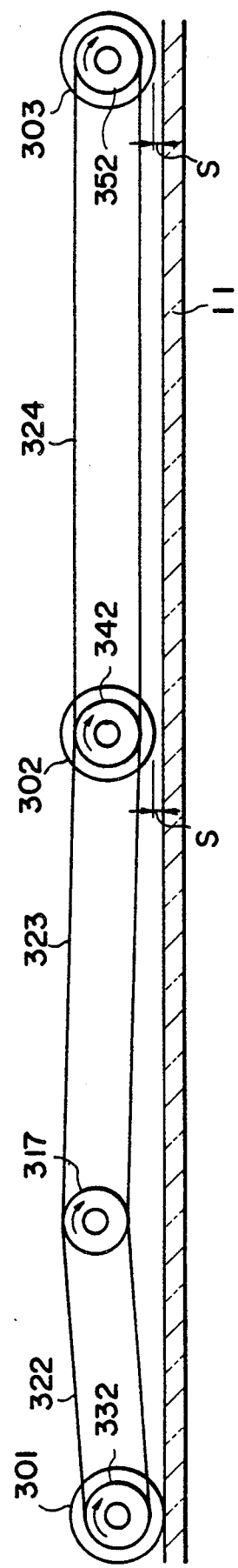

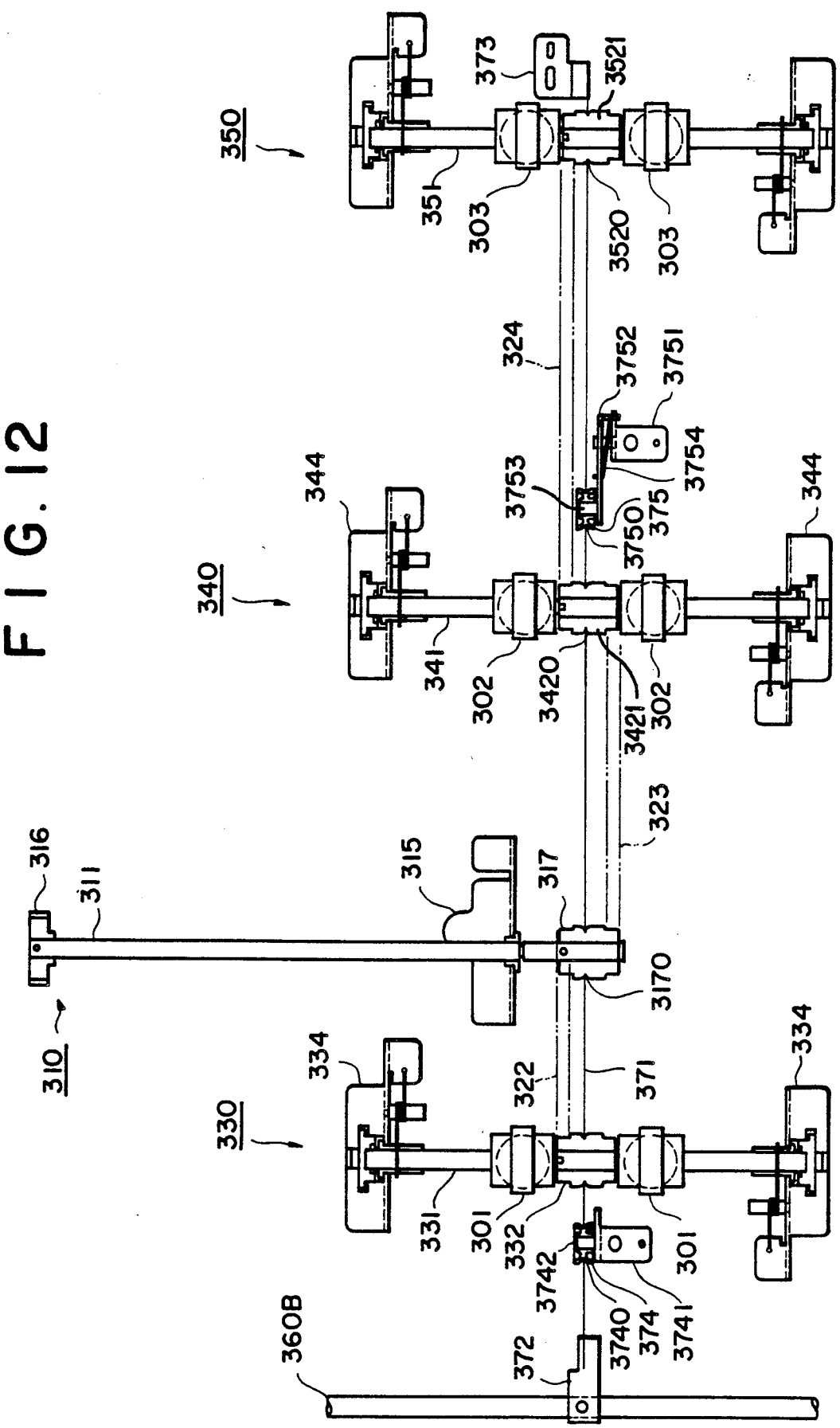

DOCUMENT CONVEYANCE APPARATUS WITH RETRACTABLE AUXILIARY CONVEYANCE ROLLER

BACKGROUND OF THE INVENTION

1. Field of the Invention

The present invention relates to improvement of a document conveyance apparatus which automatically feeds a document onto a document table (platen glass) of a copier, image reading equipment, etc. and discharges the document after processing from such document table.

2. Description of the Related Art

Generally, the document conveyance apparatus of this type is composed of a document store (paper feeding tray) placed on the side of the document table, document feeding means for feeding the document one by one onto the above document table from such paper feeding tray, document conveyance means placed on the above document table which conveys the document fed from the above document feeding means, places it correctly on the exposure position on the above document table and discharges the document from the above document table upon completion of a prescribed number of exposures, and paper discharging means which collects the documents, for which exposure has been completed, and places them on a discharging paper tray.

This document conveyance apparatus was provided with a document conveyance means which conveyed the document by pressing the document against the platen glass surface with a white endless belt on the platen glass of a copier and also by movement of such belt. In other words, this document conveyance means pressed the document by covering the entire surface of the platen glass with the endless belt and simultaneously conveyed it while generating frictional forces with appropriate places on the document surface via slight slackness therebetween. On account of the above arrangement, there were the following problematic points:

1. Space in the thickness direction became necessary to allow for the belt rotation, thereby increasing the height of the equipment proper, and the equipment became large;

2. Maintenance quality was not satisfactory because of lowering of the pressing force with the passage of time due to fatigue or degradation of the belt and also because of frequent troubles due to lack in elasticity;

3. A large-sized motor of high output had to be used, because the belt was rotated while sliding it on the platen glass.

Applicant of the present invention has earlier improved the above problematic points, and has proposed a document conveyance apparatus which can realize reduction in equipment thickness and improvement in maintenance quality (Japanese patent application No. 3341/1988).

The document conveyance apparatus of the present invention is constructed so as to have low overall apparatus height and also to permit document conveyance without use of an endless belt. A document holding sheet member (white-colored fixing sheet member, hereinafter called the sheet member) is provided along the platen glass surface in the apparatus proper placed above the copier. A document conveyance roller is slidably contacted to the above platen glass surface via holes provided at appropriate places in such sheet member.

The document conveyance roller in the above document conveyance apparatus consists of a multiple number of rollers for conveying documents of various sizes on the platen glass, and each roller will have the rotating force transmitted thereto from the driving source.

In this document conveyance apparatus, the document is normally conveyed into the space between the platen glass surface and the document holding sheet by its conveyor, then such document is sent in the reverse direction, so that the document rear end will run against the stopper board (striking board), for determining and stopping the document at the correction position, then exposure will be made on the document in such striking and stopping conditions.

FIG. 21 is a plan view showing the document sizes and the layout of conveying rollers. In the diagram, the document of various sizes will stop at the striking board 12 in the extreme left of the document table (platen glass) 11, where the document will undergo an exposure process. On the upper surface of the above document table there are provided document conveying rollers 301, 302, 303 and the white-colored sheet member 304 of the document conveyance apparatus.

However, in such document conveyance apparatus, when a document is conveyed toward the striking board on the document table, in the case of a document of the smallest size, for example, a B6 size or a B5 size document, such document will be conveyed under pressure contact, being slidably moved by one set of the document conveying rollers closest to the striking board. In the case of a document of the largest size, for example, an size document, such document will be conveyed under pressure contact, being slidably moved by a number of document conveying roller sets.

In this manner, with respect to documents of each size which are run against the striking board, in the case of a document of small size, its striking force will be small, being run and stricken only by the sliding conveying force of one set of the document conveying rollers closest to the striking. Board the case of a document of medium size and in the case of a document of large size, they are run and stricken by the sliding conveying force of 2 sets or 3 sets of the document conveying rollers. Therefore, the striking force of medium size documents and large size documents against the striking board will become large proportionately with the number of roller sets.

At the time of sending the document backward and stopping it at the striking board, when the striking force of the document caused by each document conveying roller is excessive, the rear end of the document may be folded, wrinkles may be generated in the document, or the document may be set diagonally. Alternately, there may arise such troubles as where the rear end of the document rides on the upper surface of the striking board or the document further passes above the striking board and returns to the paper feeder side.

SUMMARY OF THE INVENTION

In consideration of the above described points, the present invention aims at providing a document conveyance apparatus, where all documents of various sizes sent backward will uniformly contact with and certainly stop at the striking board, thereby permitting the document to stop at the correct position, by improvement of the document conveyance apparatus consisting of the above document holding sheet member and the document conveying rollers rotatably driven, realizing a reduction in thickness of the body frame and improvement in maintenance property as well.

In order to accomplish the above purpose, in the document conveyance apparatus consisting of the document conveying rollers, which convey the document fed from the paper feeding means in normal direction on the document table of the copier and which also convey such document in reverse direction so as to contact against the striking board, and also of the document holding sheet member, which presses the document against the document table surface, the document conveyance apparatus of the present invention is characterized by having a number of document conveying rollers. A number of roller sets are provided to press against the above document table, arranged longitudinally along the document conveying direction. The document conveyance apparatus of the present invention is also characterized by providing a means of separating the conveying rollers, at least other than the document conveying roller set closest to the above striking board, from the document table. The present invention is also characterized by having a construction where a spring clutch is built-in on the driving axle of the conveying rollers and such driving axle is moved against the spring force, thereby separating the above document conveying rollers from the document table and driving thereof. This is achieved by having a construction where a wire is connected to the driving axle of the conveying rollers, at least other than the document conveying roller set closest to the above striking board, such wire being moved correspondingly with the pressed driving of the above document holding sheet member, thereby driving the above document conveying rollers, being separated from the document table. This is also achieved by by having a construction where the conveying rollers, at least other than the document conveying roller set closest to the above striking board, are attached to the elevating means having a freely rotatable supporting board, thereby separating the above document conveying rollers from the document table and driving thereof.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention. Of the drawings:

BRIEF DESCRIPTION OF THE DRAWINGS

FIG. 8 and FIG. 10 are sectional views of elevating means for conveying rollers in embodiment 1.

FIG. 9 and FIG. 11 side views showing elevating and rotating of the conveying rollers in embodiment 1.

FIG. 12 is a plan view of the conveying mechanism in embodiment 2 of the document conveyance apparatus of the present invention.

DETAILED DESCRIPTION OF THE PREFERRED EMBODIMENT

Figure 1:
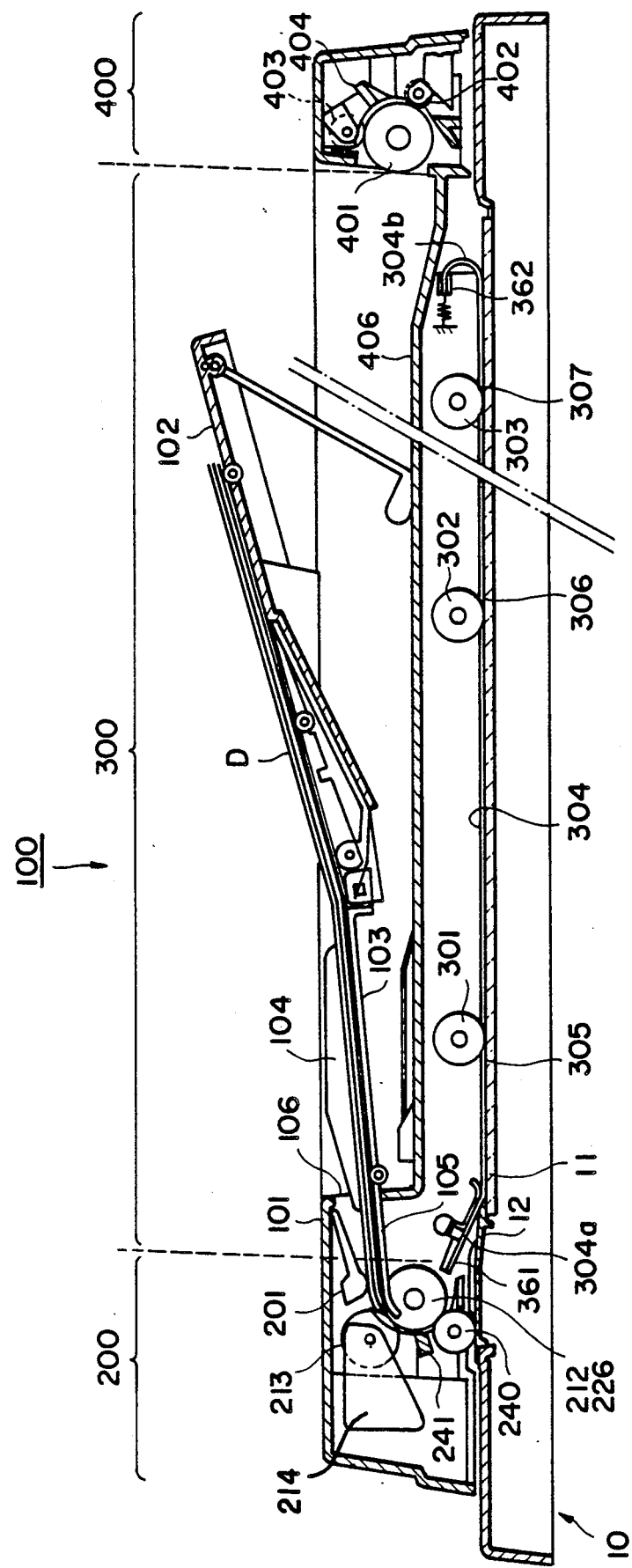
FIG. 1 is a sectional view of the document conveyance apparatus of the present invention.

Reference will now be made in detail to the presently preferred embodiments of the invention, examples of which are illustrated in the accompanying drawings. Wherever possible, the same reference number will be used throughout the drawings to refer to the same or like parts.

In FIGS. 1-5, 10 is the copier proper, 11 the platen glass (document table), 12 the document rear end stopper (striking board), and the document conveyance apparatus 100 is mounted above the platen glass 11. Such document conveyance apparatus 100 is of movable construction, being attached to the hinge above the copier proper 10, permitting opening or closing of the upper surface of platen glass 11. The above document conveyance apparatus 100 consists of the three principal parts, namely, paper feeder 200, conveyor 300 and paper discharger 400.

On the upper portion of the document conveyance apparatus 100, there is provided the paper feeding tray, consisting of the movable paper feeding plate 102, which is foldable, and the fixed paper feeding plate 103, which is firmly attached to the housing proper 101, both of which are installed with an inclination. Document D can be loaded on such paper feeding tray in layers, and the end of document D can be inserted into the paper feeder 200. Further, on the above fixed paper feeding plate 103 there are provided the paper width control boards 104, movable in the width direction, so as to control the lateral width in setting the document D.

There is a cut-out notch near the middle on the downstream side in the paper feeding direction in the above fixed paper feeding plate 103. In such cut-out notch there is a movable guide board 105, which is freely movable in the vertical direction from the upper surface of the fixed paper feeding plate 103. Such movable guide board 105 is connected to the solenoid, which is not shown in the diagram.

On the other hand, the feeding lever 201 is movably supported on top of the above movable guide board 105 in other words, the axle at one end of the feeding lever 201 is rotatably supported by the axle on top of the paper feeder outlet 106 of the housing proper 101, and of the feeding lever 201 the other end descends due to its own weight, thereby pressing the upper surface of the document D.

At the time of feeding the document, the above movable guide board 105 is in an upper position, being stopped at slightly above the outer peripheral surface of the feeding roller 212. When the document D is set on the movable paper feeding plate 102 and the fixed paper feeding plate 103 in the above position and document D is pushed out forward in the paper feeding direction, the forward end of document D is pushed out along the upper surface of the above movable guide board 105 and simultaneously pushes up the lower surface of the feeding lever 201, which is supported at the top and is hanging by its own weight. Then, document D stops by coming into contact with the outer peripheral surface of the double-feeding prevention roller 213, which is to be described later, and also with the rib of the housing proper 101. FIG. 1 is a sectional view showing this document setting condition.

When the above solenoid is supplied with electricity by the starting signal of paper feeding, the movable guide board 105 is moved and its forward end falls and starts descending from the upper surface of the above fixed paper feeding plate 103.

Next, at the left side of the document conveyance apparatus 100 (in FIG. 1), the paper feeder 200 installed on the feeding downstream side of the above paper feeding tray is provided with a sending means (No. 1 paper feeding means) for sending a bundle of document D inserted from the paper feeding tray and, further, for sending such document, by separating each sheet from the lowest layer. The paper feeder 200 is also provided with the No. 2 paper feeding means of feeding the document D onto the platen glass 11 of the copier proper 10.

This sending means consists of the sending roller (No. 1 paper feeding roller) 212 and the double-feeding prevention roller 213. The sending roller 212 is rotatably inserted in the center of No. 1 driving axle 210 and is driven by No. 2 driving axle 211. The double-feeding prevention roller 213 is axially supported by the double-feeding prevention roller attachment board 214, installed in a diagonally upper direction of such sending roller 212.

Figure 2:
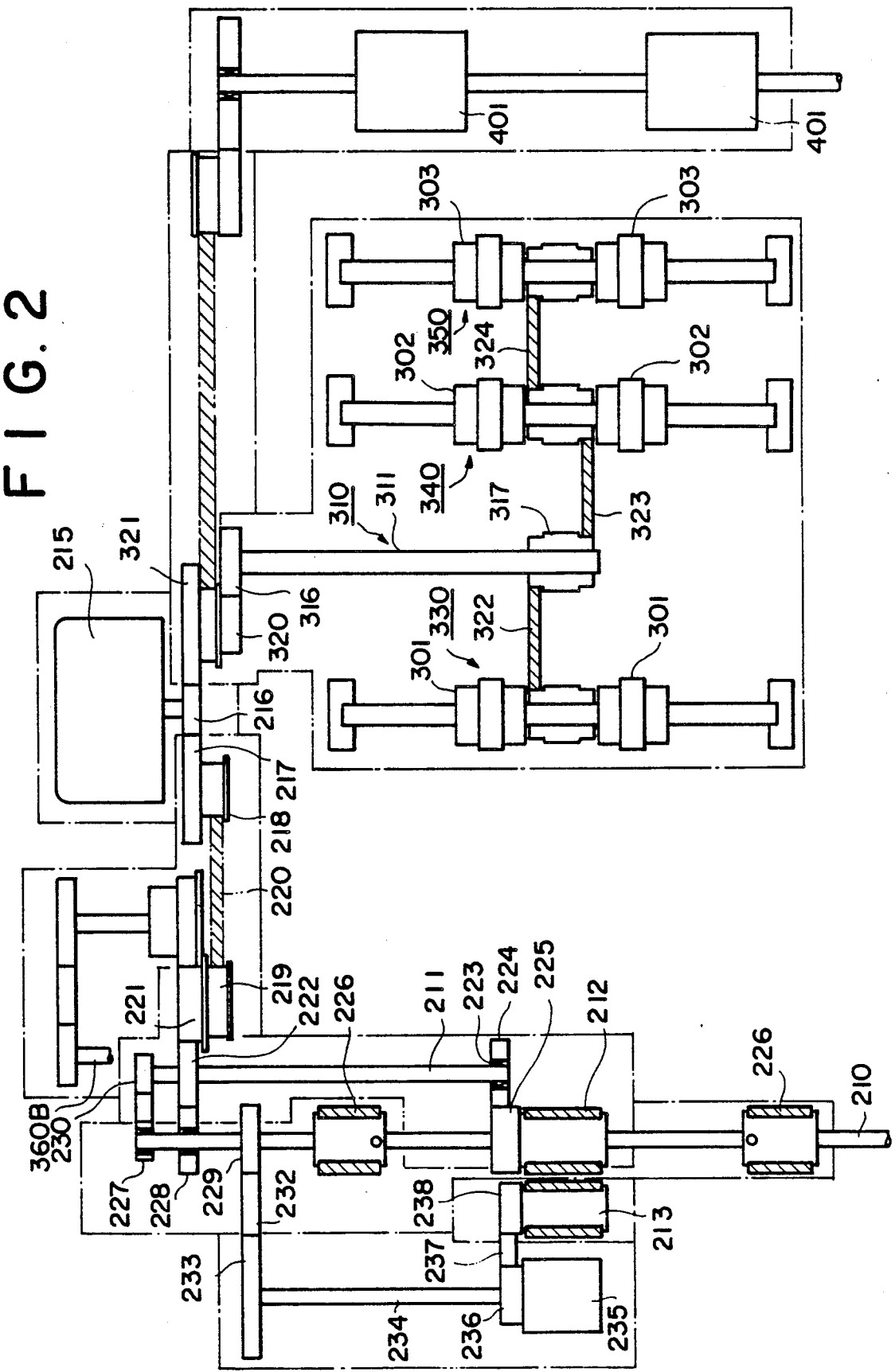
FIG. 2 is an overall driving system diagram of this document conveyance apparatus.
Figure 3:
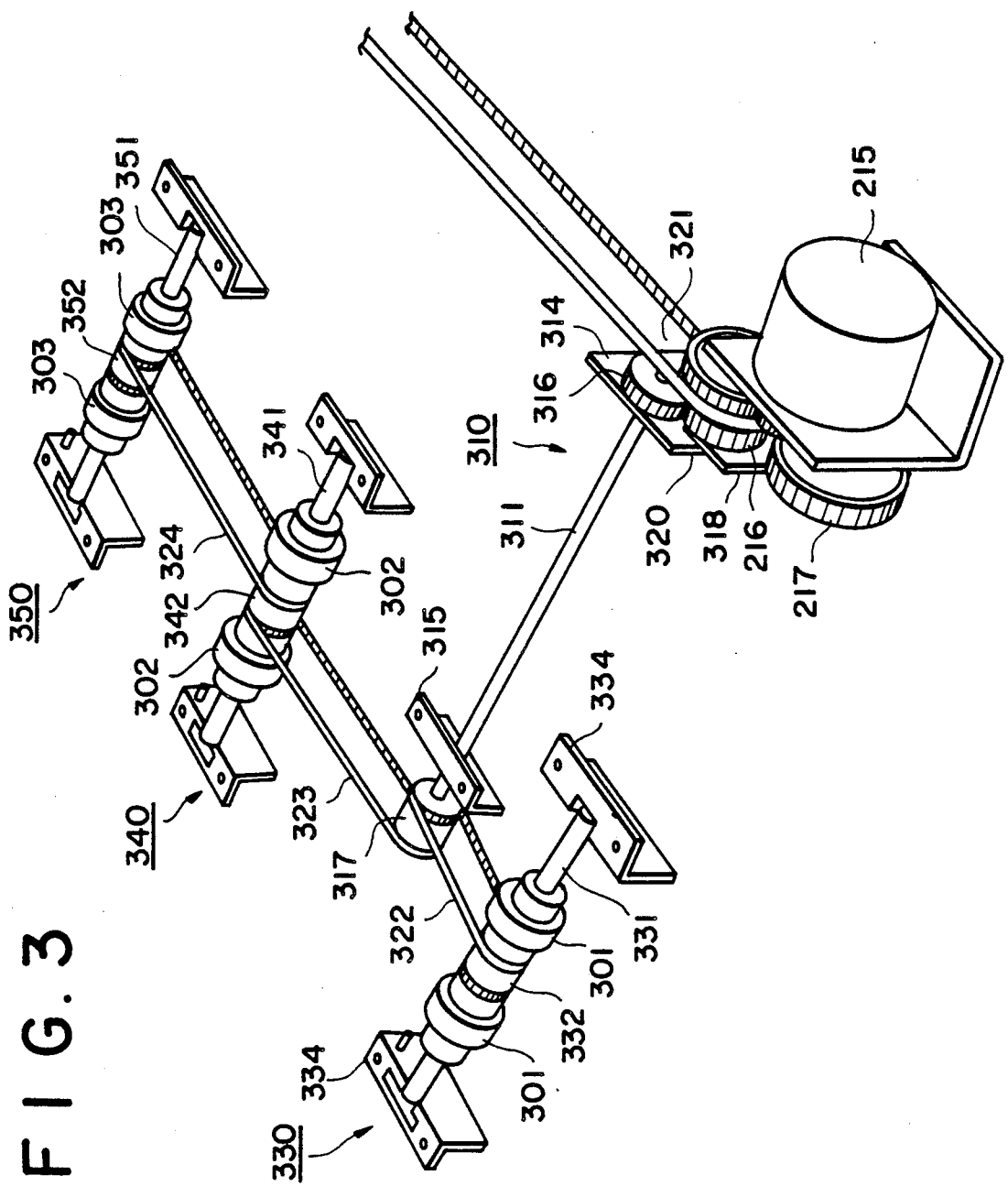
FIG. 3 is a perspective view of the conveying roller driving system.
Figure 4:
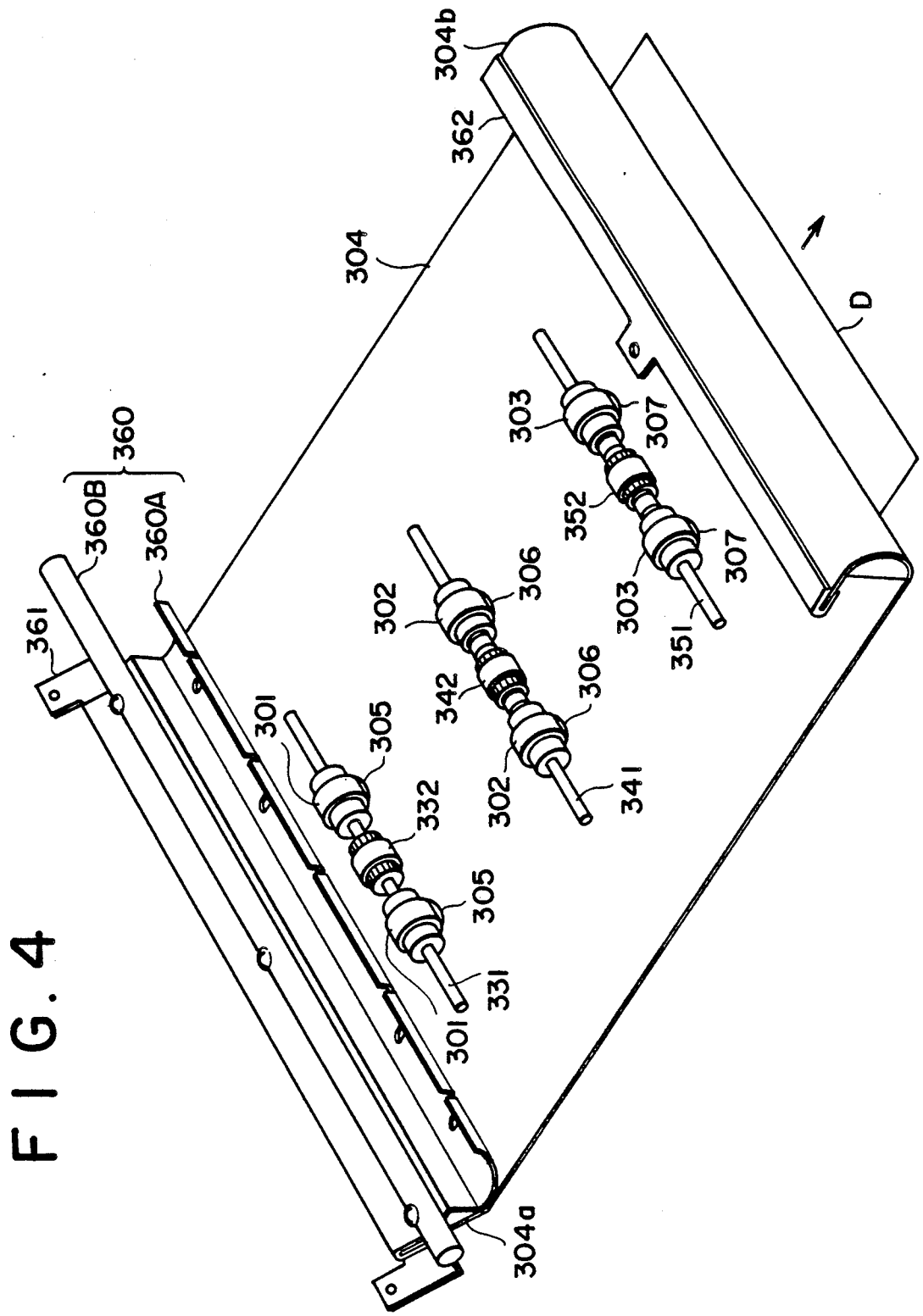
FIG. 4 is a perspective view showing the layout of the white-colored sheet member and document conveying rollers.
Figure 5:
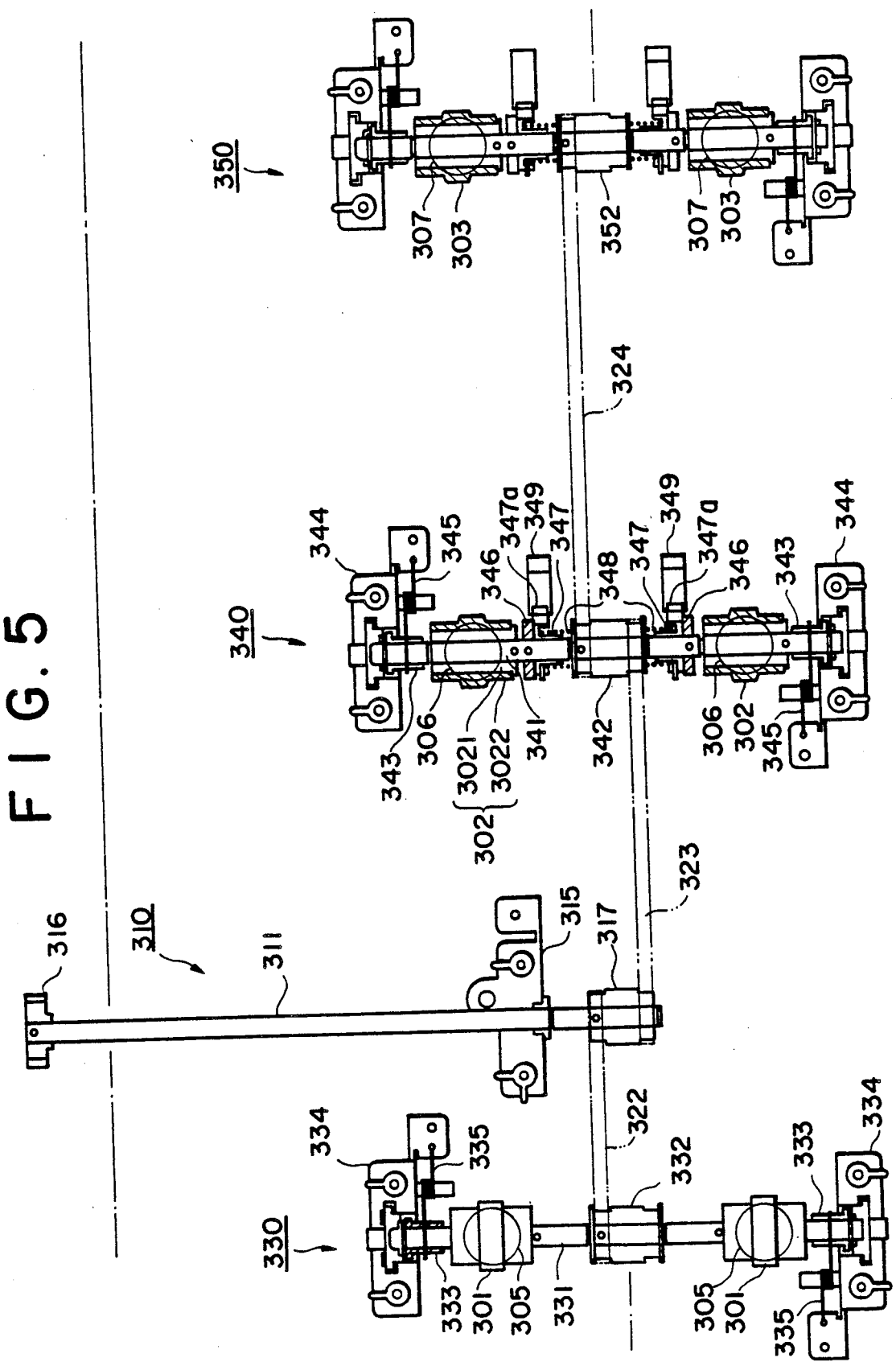
FIG. 5 is a plan view of each part of conveying rollers in embodiment 1.

FIG. 2 is the driving system diagram for the entire document conveyance apparatus. A driving axle of the main motor 215 rotates the above No. 2 driving axle 211 via gears 216 and 217, timing pulleys 218 and 219, timing belt 220, gear 221 which is coaxial with the timing pulley 219 and gear 222 which is integral with No. 2 driving axle 211. At one end of such No. 2 driving axle 211 there is provided gear 224 which has a one-direction clutch 223 built therein. This gear 224 engages with a gear 225 which is integral with the sending roller 212, rotatably inserted in the above No. 1 driving axle 210. That is to say, the main motor 215 makes normal and reverse rotation, while the sending roller 212 rotatably inserted into No. 1 driving axle 210 rotates by having power transmitted from No. 2 driving axle 211 only when the main motor 215 is making reverse rotation. The sending roller 212 rotates freely with no power being transmitted when the main motor 215 is making normal rotation.

On the other hand, No. 2 paper feeding rollers 226, 226 are fixed on the axle of No. 1 driving axle 210, on both sides of the above sending roller 212, 226, 226 thereby rotating integrally with the No. 1 driving axle 210.

Further, close to tip of the above No. 1 driving axle 210, there are respectively attached two gears 227 and 228, which have a one-direction clutch built therein, and gear 229, which is fixed on the No. 1 driving axle 210.

On the other hand, gear 230 is fixed on a tip of the above No. 2 driving axle 211. Such gear 230 engages with gear 227 at the axle tip of the above No. 1 driving axis 210.

In this manner, No. 1 driving axle 210 and No. 2 paper feeding rollers 226, 226 integral thereto always rotate in the direction of paper feeding, with respect to normal and reverse rotation of the main motor 215.

Gear 229 fixed on the axle of the above No. 1 driving axle 210 is transmitting power to No. 3 driving axle (torque limiter axle) 234 having gear 233 fixed at one tip thereof, via idler gear 232. At another tip of No. 3 driving axle 234 there is provided gear 236 having torque limiter 235. Such gear 236 engages with gear 238 which is integral with the above double-feeding prevention roller 213 via idler gear 237. Double-feeding prevention roller 213 forms a nip, being pressure contacted to the above sending roller 212 at a prescribed pressure.

As described above, the above No. 1 driving axle 210 rotates in the fixed direction, regardless of the normal or reverse rotation of the main motor 215, and it is also possible to have rotation in the fixed direction for the double-feeding prevention roller 213 coupled thereto via gears.

During the document feeding through use of the above sending roller 212 and double-feeding prevention roller 213, No. 2 paper feeding rollers 226, 226 fixed on the axis of No. 1 driving axle 210, which rotatably support the sending roller 212, also rotate at the same speed and in the same direction as the sending roller 212, thereby performing a supplementary role of U-turn feeding of the document D.

No. 2 paper feeding means in the paper feeding means 200 includes two No. 2 paper feeding rollers 226, 226 and the driver roller 240. The No. 2 paper feeding rollers 226, 226 are fixed on both sides of the above sending roller 212 and rotatably inserted on the above No. 1 driving axle 210. The driven roller 240 is pressure contacted on the lower side of such rollers 226, 226 and capable of being rotatably driven by such rollers.

These No. 2 paper feeding rollers 226, 226 can be driven independently from the sending roller 212. Further, when the sending roller 212 rotates, the No. 2 paper feeding rollers 226, 226 will rotate in the same direction, thereby not interfering with the sending of document D.

There is provided a document detection sensor 241 on the conveyance path, located downstream from the nip position in the direction of feeding, between the above sending roller 212 and double-feeding prevention roller 213 and close to the pressure contacting position of the above driven roller 240. Such document detection sensor 241 is arranged so as to be turned ON when the forward end of one document, separated from the above bundle of documents and sent to the nip position, passes. The document detection sensor 241 is arranged so as to be turned OFF when the rear end of the document passes.

When the above document detection sensor 241 detects the forward end of a document, a detection signal is issued. After a definite time from the issuance of such detection signal, the solenoid is turned ON and each member of the link mechanism is actuated, thereby descending the movable guide board 105.

Further, simultaneously with the above, while the main motor 215 shifts from reverse rotation to normal rotation, No. 1 driving axle 210 at this time still continues rotating in the same direction, and No. 2 paper feeding rollers 226, 226, fixed on the axle of such axis 210, also continue rotating in the same direction, No. 1 driving axle 210 and No. 2 paper feeding rollers 226, 226 continue rotating in the same direction via gear 230 of No. 2 driving axle 211, idler gear 232, and gear 227 which has a one-direction clutch built therein (but rotation is not transmitted to the gear 228 which has the above one-direction clutch built therein).

However, with shifting of the main motor 215 to normal rotation, No. 2 driving axle 211 will also shift from reverse rotation to normal rotation, but gear 224 will become freely rotatable because of the one-direction clutch 223 provided at the axle tip of such No. 2 driving axis 211. Rotation will not be transmitted to the gear 225 engaging thereto and the sending roller 212 integral with the gear 225.

When the forward end of document D is head with pressure between the above No. 2 paper feeding roller 226 and the driven roller 240, document D which is tightly wound between the freely rotatable sending roller 212 and the normally rotating No. 2 paper feeding roller 226 will rotate the sending roller 212 in the direction of paper feeding.

Further, double-feeding prevention roller 213 acts to prevent double-feeding of the sheets of the document and to return thereof by continuously making normal rotation, since No. 1 driving axle 210 maintains normal rotation. Additionally, No. 2 paper feeding roller 226 will continue its rotation thereafter and will continuously feed the separated one sheet of document D to conveyor 300.

Conveyor 300 is for the purpose of conveying document D on platen glass 11, and is provided with white-colored sheet member 304 and document conveying rollers 301, 302 and 303 as principal elements. White-colored sheet member 304 (hereinafter called the sheet member) is for the purpose of pressuring document D at the time of exposure and is made of plastic material (PET: polyethylene terephthalate in the present embodiment) which is rich in solid lubrication property. The sheet member 304 covers the entire upper surface of platen glass 11.

Left end 304a of the above sheet member 304 on the side of paper feeder 200 is attachably fixed in the bend of sheet stopping board 361. Both protruding ends of such sheet stopping board 361 are fixed to the frame proper of paper feeder 200 with screws.

On the other hand, right end 304b of the above sheet member 304 on the side of paper discharger 400, after making a U-turn, is attachably fixed in the bend of the other sheet stopping board 362. The center of such sheet stopping board 362 is connected to the fixed portion of conveyor 300 with pressure of a coil spring, which is not shown in the diagram.

Further, at appropriate places along the center line of sheet member 304, there are provided perforated holes 305, 306 and 307, through which tips of document conveying rollers 301, 302 and 303 are made to protrude.

Document conveying rollers 301, 302 and 303 are for the purpose of conveying document D on platen glass 11, by frictional force under pressure while rotating. The document conveying rollers 301, 302, and 303 correspond with and project through perforated holes 305, 306 and 307 on the back surface side of the sheet member 304. The surfaces of such rollers 301, 302 and 303 are covered by an elastic material having large frictional force (for example, foamed material of EPDM rubber ethylene-propylene rubber or plastics). Its tip contacts with the surface of platen glass through perforated holes 305, 306 and 307. Additionally, document conveying rollers 301, 302 and 303 can make both normal and reverse rotation, so as to permit fine adjustment for final positioning of document D at the time of exposure.

Sheet member pressuring means 360 is for the purpose of improving exposure conditions by pressing the sheet member 304 against the platen glass 11 at the time of exposing the document and also allowing smooth conveyance of the document by raising the sheet member from the surface of the platen glass 11 at the time of conveying the document. Unless a pressuring force is applied on sheet member 304, it is so arranged that such sheet member 304 is raised upward. Such pressuring means 360 consists of pressuring board 360A (swing back board) and pressuring driving axle 360B. Pressuring board 360A is co-axial with the sheet member 304, so as to permit pressuring of the sheet member 304 against the striking board 12 with uniform force, and is of an elastic member, having a protruding curved surface on the side contacting sheet member 304. The end of the pressuring driving axle 360B is connected to the main motor 215 via a series of gears, from which a driving force is transmitted to the axle. (Refer to swing back board "E" in FIG. 2.) There is provided a torque limiter at the end of the pressuring driving axle 360B. When the pressuring board 360A contacts with the striking board 12, the torque limiter will act to maintain the contacting condition and also to eliminate undue load.

Figure 6:
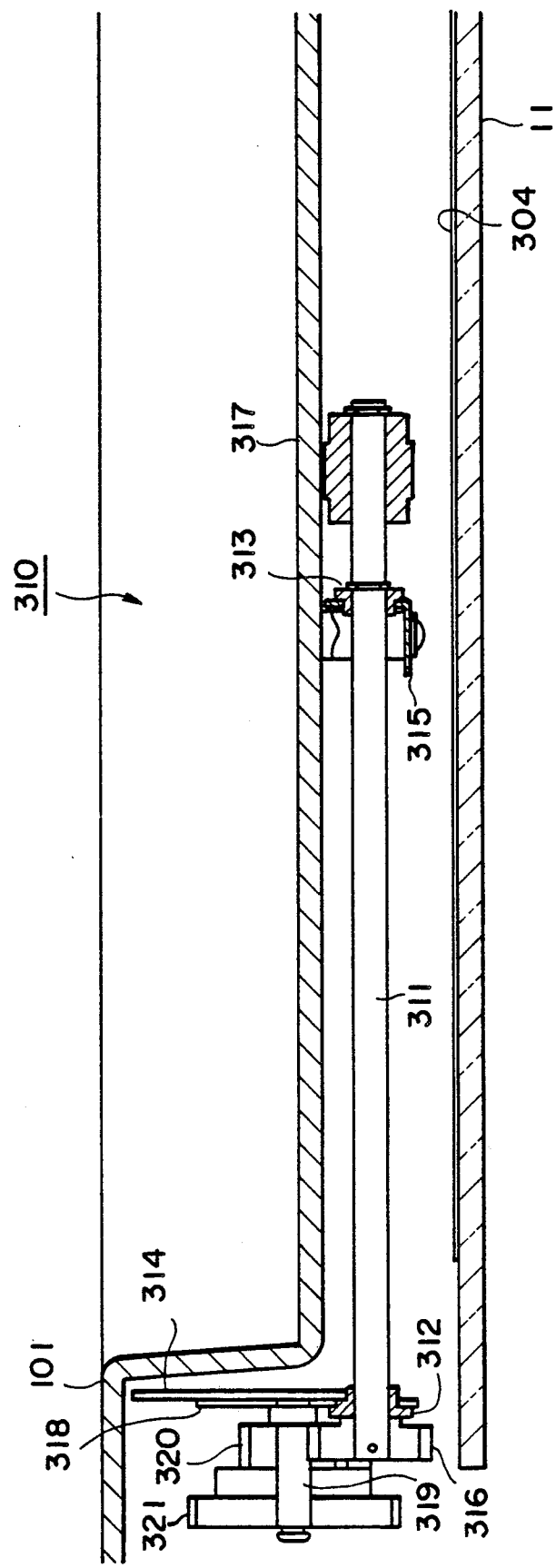
FIG. 6 is a sectional view of the conveying driver in embodiment 1.

The main motor 215 drives the paper feeder 200 and conveyor 300 simultaneously. That is to say, gear 216 which is integral with the driving scale of the main motor 215 is connected to the conveying driver 310 via a series of gears, thereby rotatably driving the driving axle (station axle) 311. FIG. 6 is a sectional view of the above conveying driver 310.

The driving axle 311 is rotatably supported by bearings 312 and 313, close to both ends of the driving axle 311, as well as by the attachment boards 314 and 315, which fix such bearings 312 and 313. Further, at one end of such driving axle 311 there is fixed the gear 316, and close to the other end there is fixed the pulley 317. Such gear 316 engages with freely-rotatable gear 320. The gear 316 has a small diameter and is located on the idler axle 319. The idler axle 319 is fixed to the attachment board 318. Such small-diameter gear 320 is integral with large-diameter gear 321. Such gear 321 engages with gear 216, which is integral with the driving axle of the above main motor 215.

In this manner, the driving rotational force of main motor 215 is transmitted via a series of gears 216, 321, 320 and 316, thereby rotating the driving axle 311.

Timing pulley 317, installed at an end of driving axle 311, has gear teeth on both ends. The teeth are rotatable for winding the timing belts 322, 323.

On the feeding upstream side of the above driving conveyor 310, there is placed No. 1 conveying roller 330. The No. 1 conveying roller 330 is driven via timing belt 322. Further, on the feeding downstream side, there is placed No. 2 conveying roller 340. The No. 2 conveying roller is driven via timing belt 323. On the farther feeding downstream side, there is placed No. 3 conveying roller 350. The No. 3 conveying roller is driven via timing belt 324.

In the center of rotating axle 331 of No. 1 conveying roller 330, there is timing pulley 332 integrally fixed on the rotating axle 331. On both sides of such timing pulley 332, there are fixed document conveying rollers 301, 301. At both ends of such rotating axle 331, there are fitted bearings 333, 333 made of an iron-copper group sintered alloy.

Such bearings 333, 333 are respectively inserted into longitudinal holes in the forward and rear conveying roller attachment boards 334, 334, and their rotation will be stopped by a notch. Rotating axle 331 of the above document conveying roller 301 is inserted into the above attachment boards 334, 334 together with bearings 333, 333. Bearings 333, 333 at both ends of rotating axle 331 will be spring energized by torsion springs 335, 335, thereby pressuring the outer peripheral surface of document conveying roller 301 against the surface of platen glass 11.

No. 1 conveying roller 330 as constructed above is pressured against platen glass 11, and will simultaneously have a driving force transmitted thereto by the timing belt 322, which is wound on the timing pulleys 317, 332.

Figure 7:
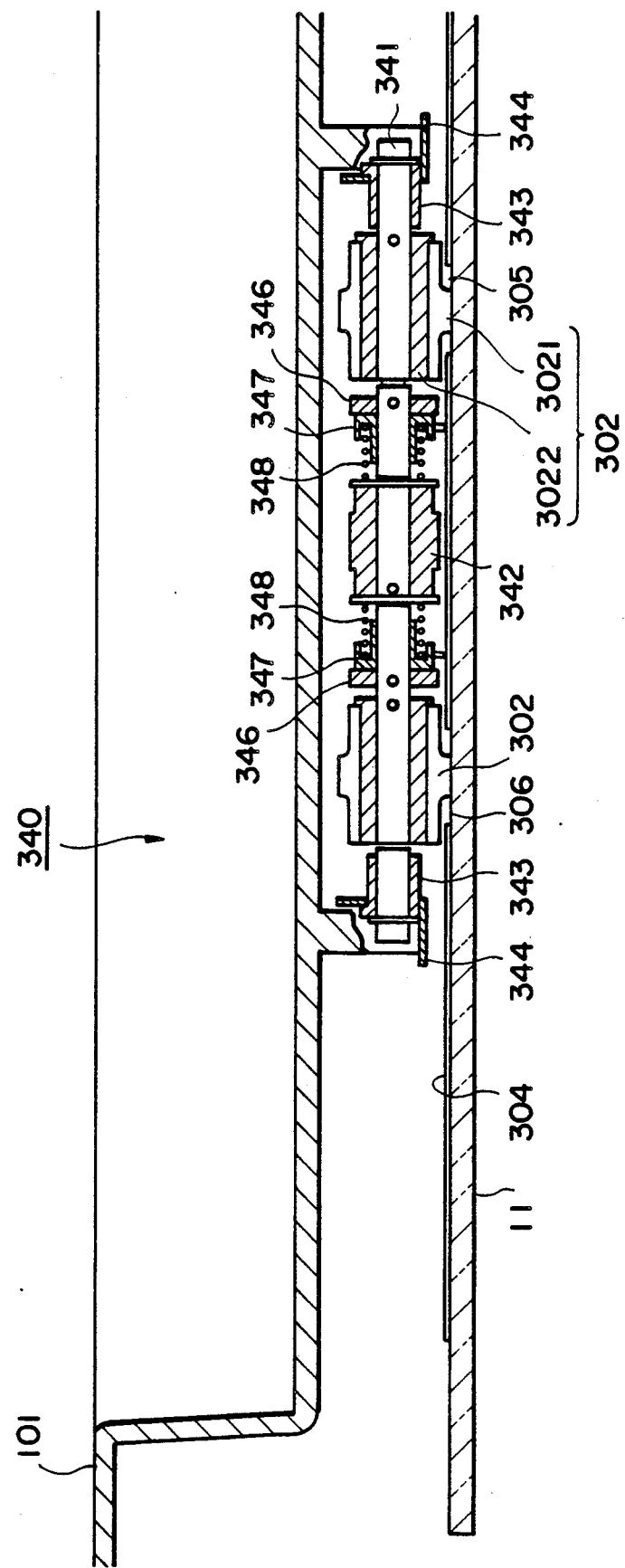
FIG. 7 is a sectional view of the conveying roller in embodiment 1.

FIG. 7 is a sectional view of No. 2 conveying roller 340.

Document conveying roller 302 of No. 2 conveying roller 340 will be similarly spring energized by torsion springs 345, 345, thereby pressuring the outer peripheral surface of document conveying roller 302 against the surface of platen glass 11. Further, by rotation of the timing belt 323 the timing pulley 342 rotates, thereby transmitting such rotation.

No. 3 conveying roller 350 consists of members common with those for No. 2 conveying roller 340. That is to say, the driving force of the above timing pulley 342 and timing belt 324 is received by timing pulley 352, and it rotates integrally with such timing pulley 352. Tensioned spring force will pressure the conveying roller, in the same manner as before, against the platen glass 11. Hereinafter, explanations will be made using No. 2 conveying roller 340 as a representative example.

On the above rotating axle 341, there are timing pulley 342, document conveying rollers 302, 302 and collars 346, 346 which are fixed with knock pins or the like.

Document conveying roller 302 consists of bush member 3022 fixed to rotating axle 341 with pin and elastic member 3021 covering the outer periphery of such bush member 3022.

Between the collar 346, fixed to the above rotating axle 341, and the timing pulley 342, spring clutch member 347 is inserted onto the rotating axle 341, permitting free movement in the axial direction as well as rotation. Between a receptacle of such clutch member 347 and timing pulley 342, there is torsion spring 348 placed in compressed condition, thereby pressuring clutch member 347 against collar 346.

FIG. 8 shows a sectional view of elevating driving means of conveying rollers 302 and 303 at the time of normal sending of document D. FIG. 9 shows a side view of each position and rotational driving of conveying rollers 301, 302 and 303 in conveyor 300 at the time of normal sending of document D.

When rotating axle 341 is rotated in a counterclockwise direction, collar 346 fixed to such rotating axle 341 will rotate as well. The clutch member 347, pressure contacted by torsion spring 348, will rotate simultaneously with roller 346 due to friction. When protrusion 347a of clutch member 347 comes into contact with the stopper surface 349a, rotation of clutch member 347 will stop and slide idly on the contact surface with collar 346.

In this condition, bearings 343, 343 which support both ends of rotating axle 341 will descend toward platen glass 11 along the inner walls of the longitudinal holes of the above conveying roller attachment boards 344, 344, and will stop descending by coming into contact with the surface of platen glass 11.

At the same time, document conveying roller 303 in No. 3 conveying roller 350 will also descend and come into contact with platen glass 11.

In a condition where the above conveying rollers 302, 303 have descended, such rollers will pressure a document on platen glass 11 and will convey the document in a normal direction by rotational driving.

By reverse driving of main motor 215, document D sent toward platen glass 11 from paper feeder 200 will slide above platen glass 11 by conveying rollers 301, 302 and 303 in conveyor 300, and rear end of document D passes the stopper for the rear end of a document (striking board) 12.

After the rear end of document D, during the document feeding, passes the above document detection sensor 241 shown in FIG. 1, a rear end detection signal is issued. After the rear end detection signal is issued, the prescribed pulse corresponding to document size is counted.

During this document normal feeding, each member in the conveying roller driver will rotate in the direction of the arrow marks shown in FIG. 8 and FIG. 9 by the driving force of main motor 215. Protrusions 347a and 357a in spring clutches 347 and 357 will rotate in the counterclockwise direction, and will stop by coming into contact with stoppers 349a, 359a.

Conveying roller driver 310 will continue rotating in the above direction of arrow mark by the driving force of main motor 215. While clutch member 347 will stop, the rotating axle 341 and document conveying roller 302 integral therewith will continue rotation and driving.

Document conveying roller 303 in No. 3 conveying roller 350 will similarly press against platen glass 11 and will rotate and drive in the counterclockwise direction. Further, since only No. 1 conveying roller 330 does not have a spring clutch, it will always rotate and drive while pressing against platen glass 11.

In other words, during the reverse driving of the above main motor 215, document conveying rollers 301, 302 and 303 will all press against platen glass 11 and rotate and drive in the counterclockwise direction, thereby normally conveying document D in the direction of the arrow mark.

When the above pulse number is counted up, (Rear end of document D has already passed the striking board 12, and is advancing on the platen glass 11.) main motor 215 is switched from reverse rotation to normal rotation, and conveying rollers 301, 302 and 303 make reverse rotation, thereby conveying document D in the reverse direction. By having the rear end of document D coming into contact with the striking board 12, document D will be set at the prescribed position on platen glass 11.

FIG. 10 is a sectional view of elevating driving means of conveying rollers 302 and 303 at the time of reverse sending of document D. FIG. 11 a side view of each position and rotational driving of conveying rollers 301, 302 and 303 in conveyor 300 in reverse sending condition of document D.

By switching the above main motor 215 to normal rotation, each of document conveying rollers 301, 302 and 303 in each of conveying rollers 330, 340 and 350 will rotate all at once in the direction of the arrow marks (rotation in clockwise direction) as shown in FIG. 10 and FIG. 11.

Clutch member 347 of No. 2 conveying roller 340 will initially rotate in the clockwise direction together with rotating axle 341, because of the pressured by torsion spring 348. When the protrusion 347a comes into contact with stopper 349b, the rotation of the clutch member 347 will stop, because its movement is obstructed, and it will rotate idly by having relative friction with collar 346 which is fixed to the rotating axis 341, which rotates when being driven.

While rotating axle 341 will continue driving rotation, due to protrusion 347a of clutch member 347 and stopper 349b, bearings 343, 343 supporting both ends of rotating axle 341 will be pushed upward, resisting the pressing force of torsion springs 345, 345, along the inner wall of the longitudinal holes of the conveying roller attachment boards 344, 344. Conveying rollers 302, 302 will separate from the surface of platen glass 11, thereby forming a gap S.

Simultaneously with the above, conveying roller 303 will also be pushed upward, and will be separated from the surface of platen glass 11. However, since conveying roller 301 of No. 1 conveying roller 330 is always rotationally driven in pressing against platen glass 11, conveying rollers 302 and 303 will retreat upward and conveyance under pressure will be made only by conveying roller 301, at the time of sending document D in the reverse direction.

Thereafter, when the prescribed pulse count is made, the rear end of document D will come into contact with the striking board 12 and the conveyance is stopped. Sheet member 304 presses document D against platen glass 11. Then exposure scanning of document D and an image forming process will be started continuously in copier body 10.

After completing exposure scanning, main motor 215 is again switched to the reverse rotation, where each rotating axle 331, 341 and 351 will rotate in the counterclockwise direction as shown in FIG. 8 and FIG. 9. Document conveying rollers 302 and 303 will make driving rotation while pressing against the surface of platen glass 11.

By pressure contacted rotation of each of the above conveying rollers 301, 302 and 303, the document will pass above platen glass 11 and be discharged being pressure held by paper discharging roller 401 of paper discharger 400 and pinch rollers 402 and 403, and be placed above the discharged paper tray 406, which is placed outside.

When the front end or the rear end of document D is detected by paper discharging sensor 404 provided in the conveying path of the above paper discharger 400, the paper feeding action for a 2nd and subsequent sheet of the document will be repeated in the same manner as above.

Figure 13:
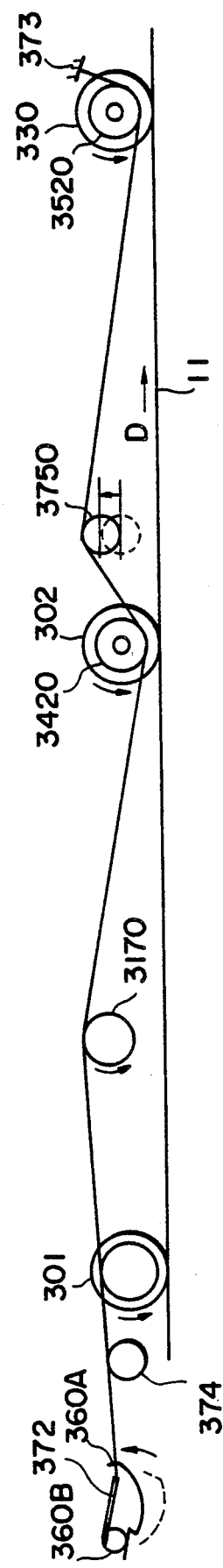
FIG. 13 and FIG. 14 are schematic illustrations which explain operating conditions of each conveying roller in embodiment 2.
Figure 14:
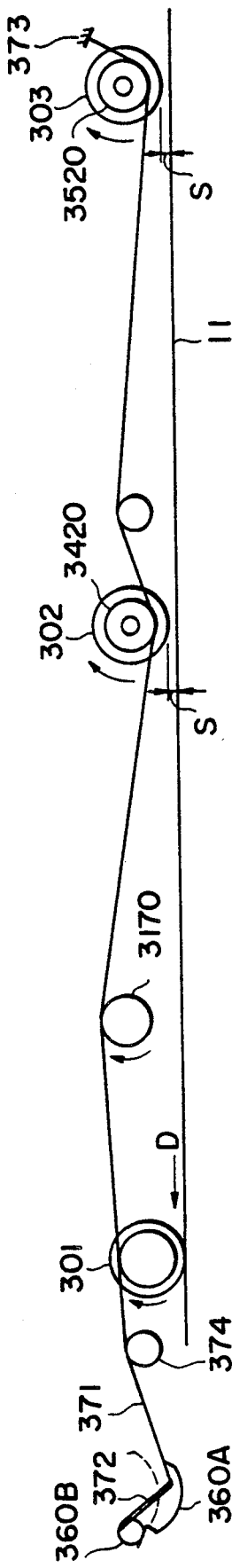

FIG. 12 is a plan view of the conveyor of the document conveyance apparatus of embodiment 2 of the present invention. FIG. 13 and FIG. 14 are schematic diagrams, explaining the elevation of document conveying rollers 302, 303. Further, in these diagrams, portions having the same functions as those in the above embodiment will be denoted by the same number. Further, explanations will be made on points which are different from the above embodiment.

Conveyor 300 consists of the conveying driver 310 which transmits the driving force of main motor 215 to document conveying rollers 301, 302 and 303, No. 1 conveying roller 330 which supports document conveying roller 301 close to the striking board 12, No. 2 conveying roller 340 which supports the middle document conveying roller 302, No. 3 conveying roller 350 which supports document conveying roller 303 close to the paper discharger 400, and the roller elevating means 370 which acts to elevate the above document conveying rollers 302 and 303 by wire.

Here, the conveying driver 310 and No. 1 conveying roller 330 have almost identical construction with the above embodiment. Explanations on the construction and functions concerning No. 2 and No. 3 conveying rollers 340 and 350 are to be omitted.

V-shaped groove 3170 is formed in the central drum of timing pulley 317 in conveying driver 310, to which wire 371, to be described later, will be hung. Further, V-shaped grooves 3420 and 3520 of the same form as above are respectively formed in each central drum of timing pulleys 3421 and 3521 in No. 2 and No. 3 conveying rollers 340 and 350.

Flap board 372 is fixed to the pressure driving axle 360B of the above sheet pressing means 360, on the side close to paper feeder 200. One end of wire 371 is fixed at the tip of such flap board 372.

Close to document conveying roller 303, there is the terminal fixing member 373 attached to the above housing proper 101. The other end of wire 371 is fixed to the terminal fixing member 373, thereby permitting adjustment of wire hanging.

Between the above flap board 372 and the terminal fixing member 373, there are provided guide roller 374 and tension roller 375. Both guide roller 374 and tension roller 375 have V-shaped grooves 3740 and 3750 of the same form as above formed thereon.

Guide roller 374 is freely rotatable, being supported by the supporting board 3741 and guide pin 3742.

Tension roller 375 is supported by supporting board 3751, shaking lever 3752 and pin 3753. Tension roller 375 is freely movable and rotatable to flip by the tension of spring 3754.

The wire 371 is held by the flip board 372 at its left end and is held by the terminal fixing member 373 at its right end, and is suspendedly hung. The wire 371 is pressured, in its middle portion, by V-shaped groove 3740 of guide roller 374, V-shaped groove 3170 on the axis of conveying driver 310, V-shaped groove 3420 on the same axle as document conveying roller 302, V-shaped groove 3750 of tension pulley 375 and V-shaped groove 3520 on the same axle as document conveying roller 303.

FIG. 13 is a schematic diagram showing actions of the conveyor 300, when document D is normally conveyed in the direction of the arrow mark.

At the time of this normal conveying, the document conveying rollers 301, 302 and 303 are driven and rotated in the counterclockwise direction. Moreover, at this time the pressuring driving axle 360B of sheet pressuring means 360 will also be driven in the counterclockwise direction. The pressuring board (swing back board) 360A fixed to such pressuring driving axle 360B will move to the upper position shown with a solid line, thereby facilitating document conveyance by not pressuring sheet member 304 and making it free.

By this rotation of pressuring driving axle 360B in the counterclockwise direction, the flap board 372 fixed to such axle will also rotate in the counterclockwise direction, thereby loosening the tension in wire 371. Therefore, document conveying rollers 302 and 303, forming one body with V-shaped grooves 3420 and 3520, which are wound with such wire 371, will descend because they are spring energized. The document conveying rollers 302 and 303 will, thereby pressure the surface of platen glass 11. Further, wire 371 is laid so that its tension or relaxation can be absorbed by upward movement of tension roller 375, being energized by a spring.

Driving rotation by the above document conveying rollers 301, 302 and 303 and pressuring against platen glass 11 will normally convey document D in the direction of the arrow mark, with the joint action of releasing pressure by sheet member 304.

When conveying document D in the reverse direction toward the striking board 12, document conveying rollers 301, 302 and 303 are made to rotate in the clockwise direction by switching driving axle 311 reverse. Simultaneously pressuring driving axle 360B will rotate in the counterclockwise direction and flap board 372 fixed to such axle will also rotate in the counterclockwise direction, thereby lowering the wire 371.

By the above actions, wire 371 will raise conveying rollers 302 and 303 upward, against the tensioned spring force, via guide roller 374 and V-shaped groove 3170 on the driving axle 311. Raising the conveying rollers 302 and 303 forms a gap S between upper surface of platen glass 11 and lower peripheral surface of document conveying rollers 302 and the 303.

Simultaneously with the above, pressuring board 360A will also descend and also press against the striking board 12 via sheet member 304, thereby shutting the space above the striking board 12.

In this condition, since document conveying rollers 302 and 303 have retreated to the upper position, document D will be conveyed reversely in the direction the arrow mark in FIG. 14 on platen glass 11 only by driving rotation of document conveying roller 301. The document D will come in contact with the end surface of the striking board 12, which is in sealed condition, thereby determining the document position.

Further, while the wire 371 is respectively wound on the timing pulley 3421 in the central portion of No. 2 document conveying rollers 302, 302 and on the timing pulley 3521 the central portion of No. 3 document conveying rollers 303, 303, the present invention is not necessarily restricted to this point. By laying a total of 2 wires, one wire close to both ends of rotating axle 341 which fixes No. 2 document conveying rollers 302, 302, and also close to both ends of rotating axle 351 which fixes No. 3 document conveying rollers 303, 303, elevating of each roller can be made more certain.

Figure 15:
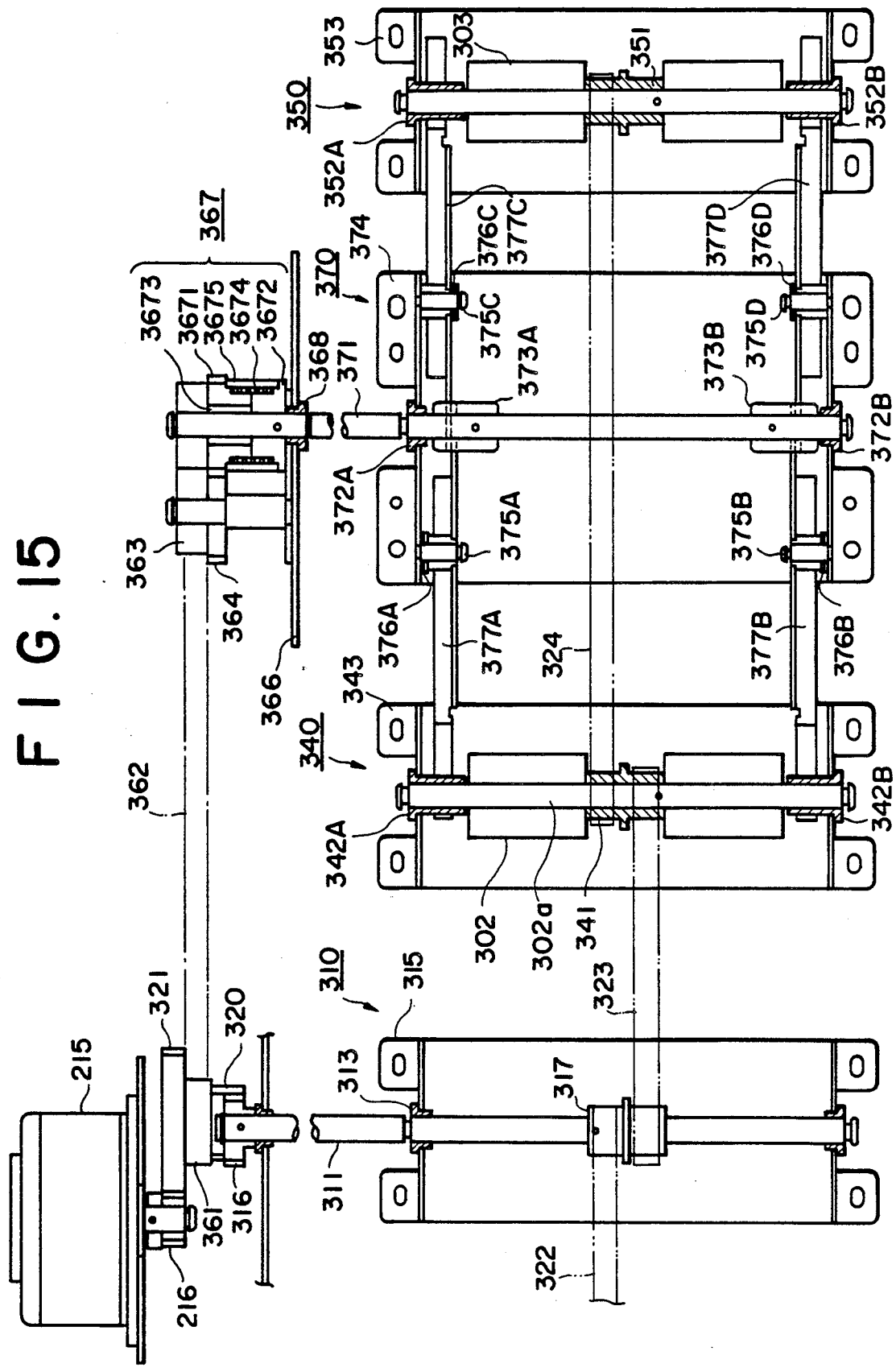
FIG. 15 a plan view of the conveying roller driving system in embodiment 3.
Figure 17:
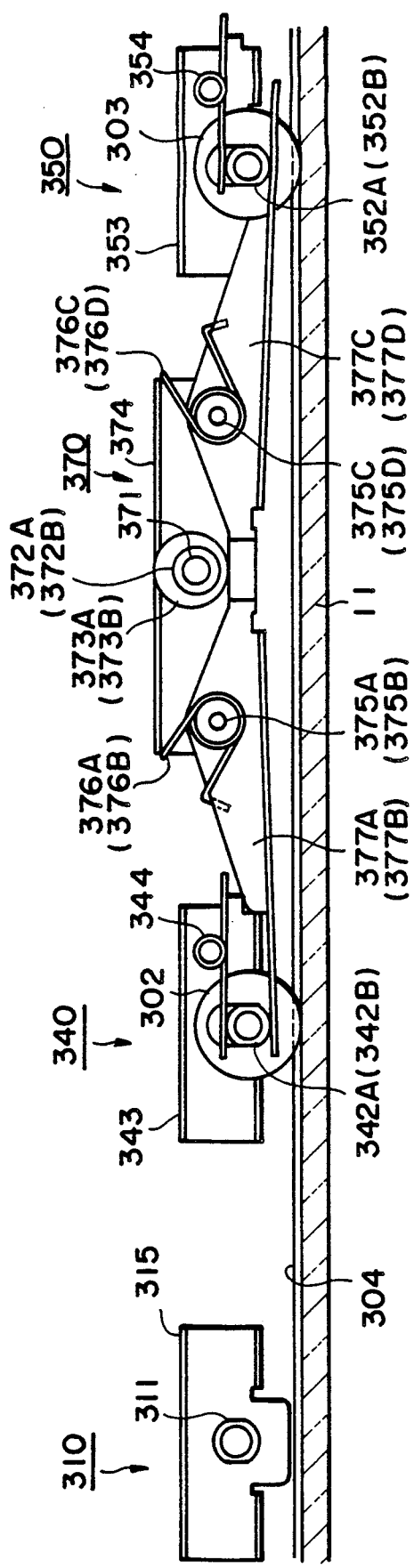
FIG. 17 and FIG. 20 are side views of the conveying roller elevating means in embodiment 3.
Figure 18:
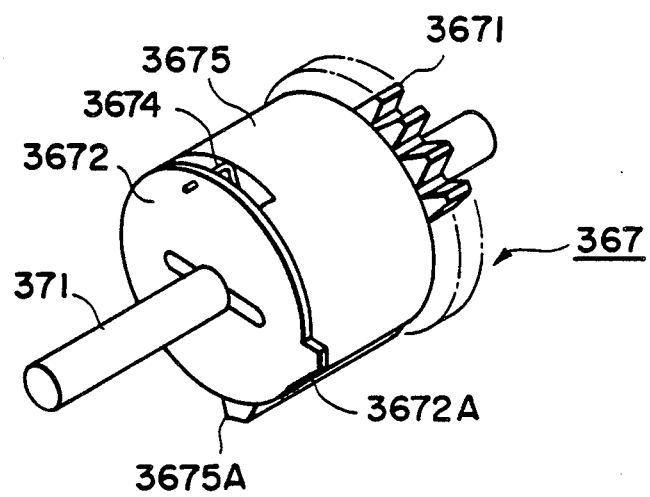
FIG. 18 is a perspective view of the spring clutch.

FIG. 15 is a plan view of the conveyor of the document conveyance apparatus of embodiment 3 of the present invention. FIG. 16, FIG. 17, FIG. 19 and FIG. 20 are schematic diagrams for explaining the elevation of the document conveying roller. FIG. 18 a perspective view of a spring clutch. Further, in these figures, portions having the same functions as those in embodiments 1 and 2 will be denoted by the same number.

Further, points different from embodiments 1 and 2 will be explained.

Driving rotational force of main motor 215 is transmitted via a series of gears 216, 321, 320 and 316 and rotates the driving axle 311, in the same manner as in the above two embodiments.

Timing pulley 317, fixed along the axis and near the end of driving axle 311, has gear teeth on both ends, and is rotatable by winding timing belts 322 and 323 respectively.

On the feeding upstream side of driving conveyor 310 there is placed No. 1 conveying roller 330, not shown in the diagram, driven via timing belt 322. Further, on the feeding downstream side there is placed No. 2 conveying roller 340, driven via timing belt 323. Further, on the feeding downstream side there is placed No. 3 conveying roller 350, driven via timing belt 324.

The above conveying rollers 330, 340 and 350 all consist of common members. Therefore, the conveying roller 340 will be explained and is intended to be considered as representative of the remaining conveying rollers.

At the center of rotating axle 302a, which is integral with document conveying roller 302, there is fixed the timing pulley 341. Further, at both ends of such rotating axle 302a, there are insertedly fitted bearings 342A and 342B of iron and copper group sintered alloy.

Such bearings 342A and 342B are inserted in the longitudinal holes in front and rear conveying roller attachment board 343, respectively, and their rotation is stopped by a notch. Rotating axle 302a of the above document conveying roller 302 is inserted in the above attachment board 343 together with bearings 342A and 342B. Because they are spring energized, bearings 342A and 342B will cause the outer periphery of document conveying roller 302 to contact the surface of platen glass 11 under pressure.

No. 1 conveying roller 330, not shown in the diagram, which is constructed in the same manner as No. 2 conveying roller, will have a driving force transmitted thereto by the timing belt 322 while being pressed against platen glass 11. Timing belt 322 is wound on timing pulleys 317, 331.

Document conveying roller 302 of No. 2 conveying roller 340 is spring energized in a similar manner. The document conveying roller 302 will have rotation transmitted thereto by rotation of the timing belt 323 which rotates the timing pulley 341.

Here, 342A and 342B are bearings which rotatably support both ends of conveying roller 302. The bearings 342A and 342B can move in the vertical direction, being inserted in the long holes of attachment board 343. The conveying roller 302 is pressed against platen glass 11 by torsion spring 344.

Document conveying roller 303 of No. 3 conveying roller 350 receives a driving force from the above timing pulley 341 and timing belt 324 through timing pulley 351. The document conveying roller 303 rotates integrally with such timing pulley 351. Spring energized force will pressure the document conveying roller 303, in the same manner as before, thereby pressing against the platen glass 11.

Here, 352A and 352B are bearings which rotatably support both ends of conveying roller 303. The bearings 352A and 352B can move in vertical direction, being inserted in the long holes of attachment board 353. The conveying roller 303 is pressed against platen glass 11 by torsion spring 354.

Figure 16:
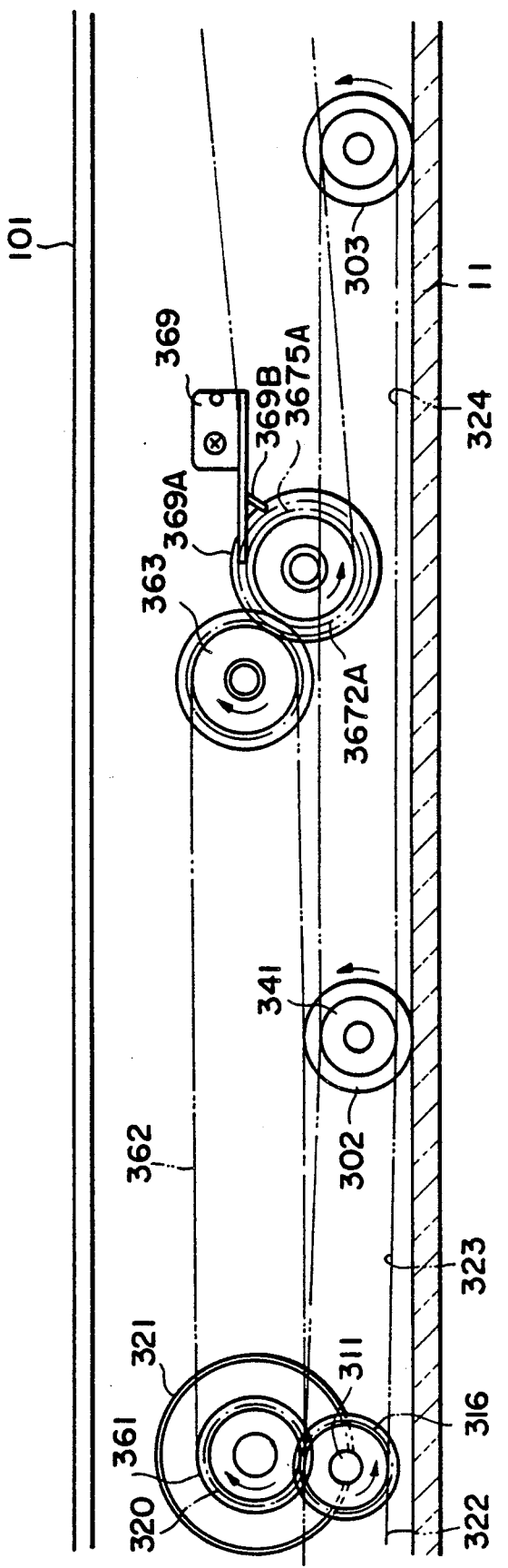
FIG. 16 and FIG. 19 are side views of the conveying roller driving system in embodiment 3.

FIG. 16 is a side view of the rotational driving means of conveying rollers 302 and 303, showing the document conveying alignment. FIG. 17 a side view of the elevating driving means of such conveying rollers 302 and 303.

On the axis of the above gears 320 and 321, there is timing pulley 361 integrally formed therewith. The timing pulley 361 wound to the other timing pulley 363 by timing belt 362. Such timing pulley 363 forms one body with gear 364 and is rotatable around the supporting axle 365 placed on the supporting base board 366. The above gear 364 engages with gear 3671 in spring clutch 367 provided at one end of the cam axle 371, to be described later. Such cam axle 371 is rotatably supported by bearing 368 fixed to the above supporting base board 366 and by bearings 372A and 372B provided in supporting board 374 of the conveying roller elevating means 370, to be described later.

FIG. 18 is a perspective view of spring clutch 367. In the diagram, spring clutch 367 consists of hub 3672, cam axle 371, gear 3671, coil spring 3674, collar 3675, protrusion 3672A, and protrusion 3675A. Hub 3672 is fixed to cam axle 371. The gear 3671, which is freely rotatable, is integral with the sliding bearing which fits into cam axle 371. Coil spring 3674, which is freely tightened or loosened, is wound to each drum of such gear 3671 and hub 3672, and collar 3675 which ties one end of such coil spring and covers the coil spring. Protrusion 3672A is formed on a part of the periphery of the above hub 3672. Rotation of hub 3672 will stop when such protrusion 3672A comes into contact with one tongue 369A of the stopper 369, fixed to supporting base board 366.

Further, protrusion 3675A is formed on a part of the periphery of collar 3675. Rotation of collar 3675 will stop when such protrusion 3675A comes into contact with the other tongue 369B of the above stopper 369.

On the above cam axle 371, there are eccentric cams 373A and 373B fixed thereon.

On both front and rear side walls of the above attachment board there are studded 4 supporting axle 375A, 375B, 375C and 375D, on each of such supporting axle there are wound coil springs 376A, 376B, 376C and 376D. Further, on each of such supporting axles there are respectively inserted flap levers 377A, 377B, 377C and 377D.

The flap levers 377A and 377B are respectively spring energized by coil springs 376A and 376B, and are thereby urged in the counterclockwise direction, raising the right end (refer to FIG. 17) of each flap level 377A and 377B until they contact with eccentric cams 373A, 373B under pressure. The flap levers 377A and 377B are centered around the axles supporting 375A, 375B. On the other hand, the left ends of flap levers 377A and 377B descend. Conveying roller 362 of No. 2 conveying roller 340 descends along the long hole of attachment board 343, by tensioned spring force of torsion spring 344 as well as its own weight, and comes into contact with the upper surface of platen glass 11, pressing thereon.

Simultaneously with the above, the other flap levers 377C and 377D are respectively energized by coil springs 376C and 376D, and are urged in the counterclockwise direction, raising the left end (refer to FIG. 8) of each of the flap levers 377C and 377D until they contact with the eccentric cam 373C, 373D under pressure. The flap levers 377C and 377D are centered about the above supporting axle 375A and 375B. On the other hand hand, the right ends of such flap levers 377C and 377D descend. Conveying roller 303 of No. 3 conveying roller 350 descends along the long hole of attachment board 353, by tensioned spring force of torsion spring 354 as well as its own weight, and comes into contact with the upper surface of platen glass 11, pressing thereon.

When conveying a large-sized document (for example, A3 size, B4 size, etc.), the document on platen glass 11 is conveyed by driving rotation under pressure, in conditions where the above conveying rollers 302 and 303 are in the descended state.

A large-sized document D fed toward platen glass 11 from paper feeder 200, by reverse driving of main motor 215, will slide on the platen glass 11 by conveying rollers 301, 302 and 303 of conveyor 300 shown in FIG. 1. The rear end of document D will pass over the document end stopper (the striking board) 12.

After the rear end of document D, which is being fed, passes the above document detection sensor 241 and the rear end detection signal is issued, a prescribed pulse corresponding to document size will be counted.

During this normal sending of document D, each member of the conveying roller driver rotates in the direction of arrow mark shown in FIG. 16 by the driving force of the main motor 215. Hub 3675 of spring clutch 367 rotates in the counterclockwise direction, and protrusion 3675A stops by coming into contact with tongue 369B of stopper 369. This hub 3675 of spring clutch 367 rotates as one body with cam axle 371, being pin connected thereto. Cams 373A and 373B will stop, when they reach the upper dead point shown in FIG. 17.

The conveying roller driver continues to rotate in the direction of the above arrow mark by the driving force of main motor 215. While gear 3671 of spring clutch 367 is also rotating continuously, depending on the degree of looseness in coil spring 3674, which is built in spring clutch 367, it will rotate idly with sliding bearing 3673. Thus the driving force will not be transmitted to cam shaft 371.

When this pulse number is counted up, the main motor 215 will have its rotation changed from reverse to normal. Conveying rollers 301, 302 and 303 will rotate in the reverse direction and cause the rear end of document D to contact with the striking board 12, thereby placing document D in the prescribed position on the platen glass 11.

Figure 19:
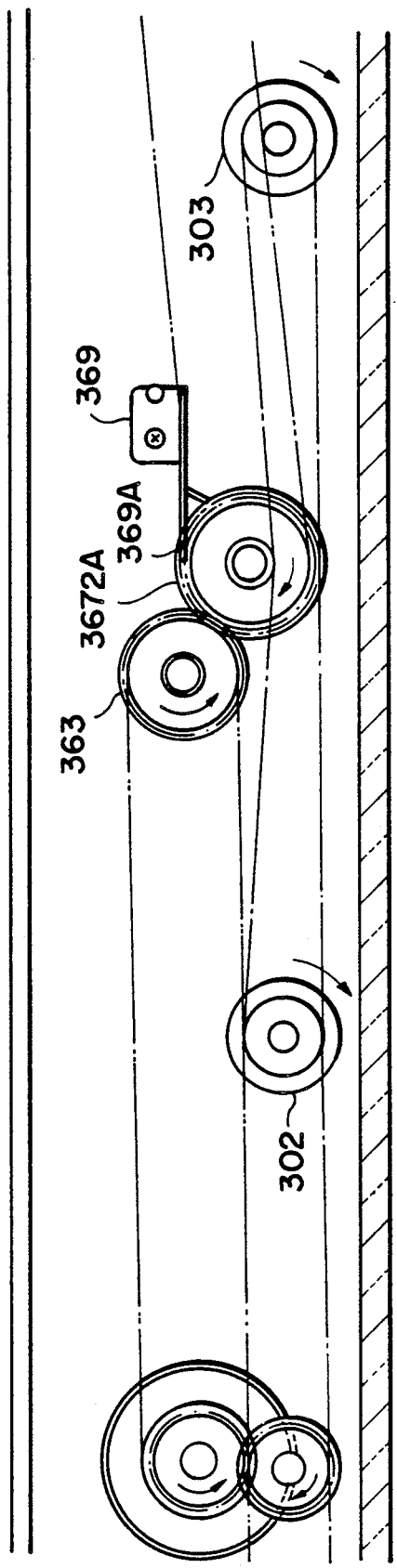
Figure 20:
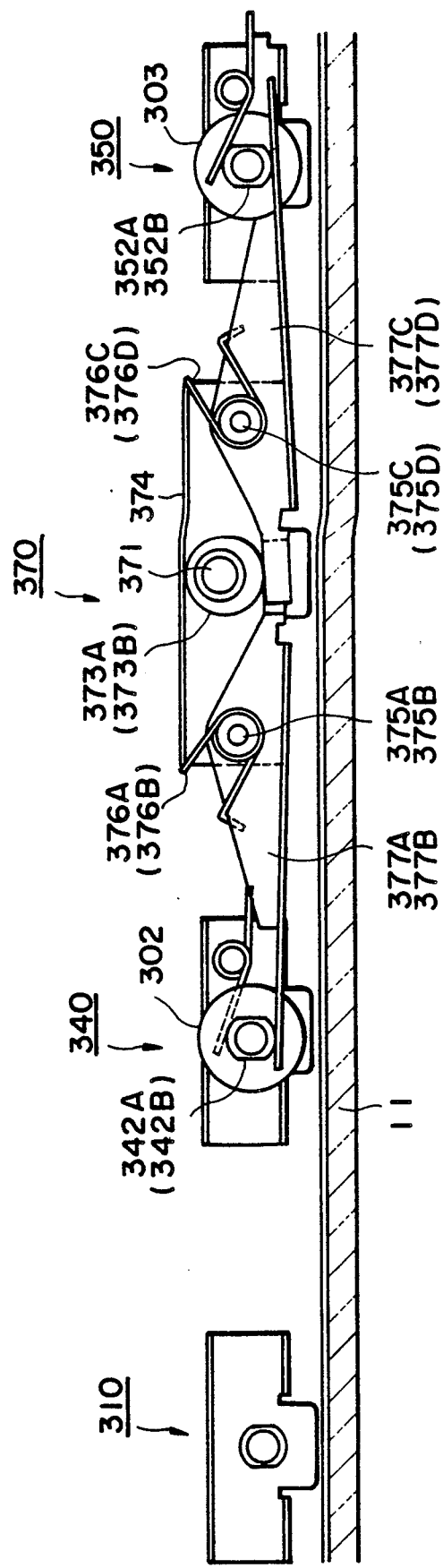
Figure 21:
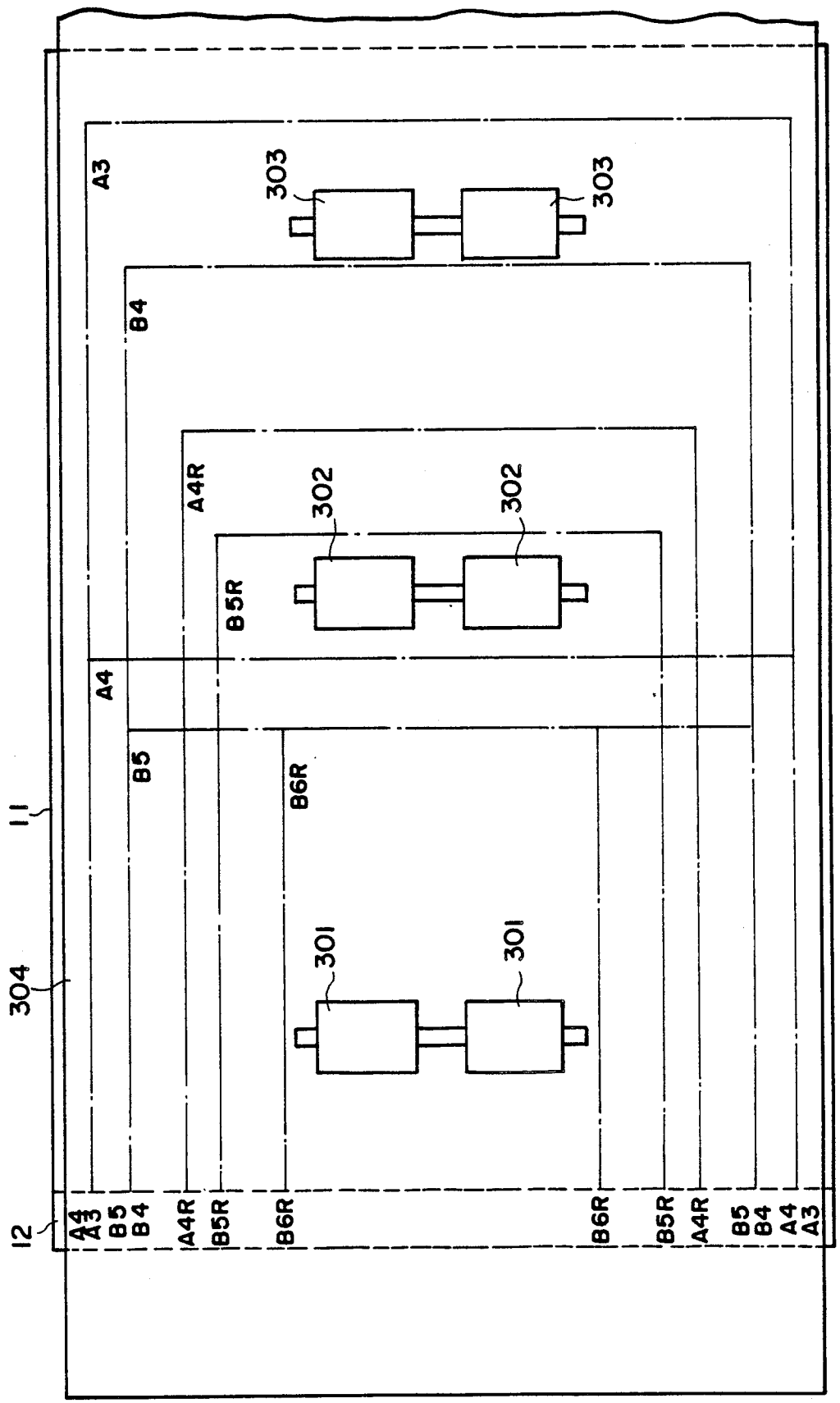
FIG. 21 is a plan view showing document sizes and conveying roller layout.

FIG. 19 is a side view of rotational driving means of conveyor 300 in document reverse sending condition. FIG. 20 a side view of elevating driving means of conveying rollers 302 and 303 at the time of document reverse sending.

By normal rotation of the above main motor 215, each member of the conveying roller driver will rotate in the direction of the arrow mark, shown in FIG. 19. Gear 3671 of spring clutch 367 rotates in the clockwise direction, thereby integrally rotating hub 3672, which is spring connected to such gear 3671 via coil spring 3674. Protrusion 3672A of hub 3672 rotates in the reverse direction and comes into contact with tongue 369A of the above stopper 369, and hub 3672 stops. By the above action, cam axis 371 integral with hub 3672 will also stop after rotating in the reverse direction, and cams 373A and 373B come to the lower dead point shown in FIG. 20. Further, the above gear 3671 continues to rotate in the reverse direction by normal driving force of the above main motor 215, even after hub 3672 has stopped, depending on the slackening condition of coil spring 3674.

Due to rotational movement of the above cams 373A and 373B to the lower dead point, flap levers 377A and 377B will flip, centering around supporting axle 375A and 375B respectively, being pressured by such cams 373A and 373B. The ends of flap levers 377A and 377B will pressure against and push up bearings 342A and 342B, inserted into both ends of conveying roller 302, thereby separating conveying roller 302 from the surface of platen glass 11.

Simultaneously with the above, flap levers 377C and 377D will also be moved by the above cams 373A, 373B, thereby separating conveying roller 303 from the surface of platen glass 11. However, since conveying roller 301 of No. 1 conveying roller 330 is always driven rotatably, pressing against platen glass 11, the document is pressure conveyed only by conveying roller 301, regardless of document size.

After, after the prescribed pulse count, the sheet member 304 will pressure contact document D to platen glass 11, and exposure scanning and image forming process of the document will be started consecutively within the copier proper 10.

Document D, for which exposure scanning has been completed, passes above platen glass 11 by pressured rotation of conveying rollers 301, 302, and 303, is discharged being held with pressure by paper discharging roller 401 of paper discharger 400 and pinch rollers 402, 403, and is placed above the paper discharging plate 406, which is located outside.

When the front end or rear end of document D is detected by paper discharging sensor 404, placed in the conveying path of the above paper discharger 400, paper feeding actions for second and subsequent sheets will be repeated in the same manner as described above.

As described in the foregoing, the document conveyance apparatus of the present invention is a document conveyance apparatus of the roller conveying type, which has realized reduction in equipment thickness and improvement in maintenance quality, in each of embodiments 1, 2 and 3. Particularly, when a document is sent in the reverse direction toward the striking board, the document is conveyed by reverse driving by at least one set of conveying rollers closest to the striking board, among a number of conveying rollers. Since other rollers are separated from the surface of platen glass, the document being sent in the reverse direction will be sent smoothly in the reverse direction always by a constant conveying force, regardless of the document size. By such arrangement, the pressure contacting force, for stopping the document being sent in reverse direction, against the striking board will become nearly constant, thereby eliminating troubles such as damage to the document, unsatisfactory determination of document position, etc. Further, the elevating means for the conveying rollers does not require an exclusive power source and construction of the conveyor is simple, thereby exhibiting excellent effects in realizing low cost and improvement of reliability.

Additional advantages and modifications will readily occur to those skilled in the art from consideration of the specification and practice of the invention disclosed herein. It is intended that the specification and examples be considered as exemplary only, with the true scope and spirit of the invention being indicated by the following claims and their equivalents.

What is claimed is:

1. A document conveyance apparatus for conveying a document to a predetermined position on a platen of a copying apparatus, comprising:
   a document feed means for feeding said document from outside of said document conveyance apparatus;
   a conveyance roller means, located on said platen, for conveying said document from said document feed means onto said platen by rotating in the forward direction and for subsequently bringing the trailing edge of said document into contact with an edge setting member, located adjacent to said platen, by rotating in the reverse direction so that said document is set at said predetermined position on said platen;
   an auxiliary conveyance roller means, located on said platen, for conveying said document onto said platen by cooperating with said conveyance roller means when said document is longer than a predetermined size; and
   a roller retraction means for retracting said auxiliary conveyance roller means from said platen so that said auxiliary conveyance roller means does not convey said document,
   wherein said auxiliary conveyance roller means is capable of being retracted from said platen by said roller retraction means while said conveyance roller means is rotating in the reverse direction to bring said document into contact with said edge setting member.

2. The apparatus of claim 1, wherein said roller retraction means comprises a spring clutch member for retracting said auxiliary conveyance roller means when said conveyance roller means rotates in the reverse direction.

3. The apparatus of claim 1, wherein said roller retraction means comprises a wire member for retracting said auxiliary conveyance roller means.

4. The apparatus of claim 1, wherein said roller retraction means comprises an arm member and a cam member for pivotally moving the arm member, said auxiliary conveyance roller means being rotatably positioned on said arm member and retractable from said platen in response to movement of said cam member.

* * * * *

UNITED STATES PATENT AND TRADEMARK OFFICE
CERTIFICATE OF CORRECTION

PATENT NO. : 5,001,520
DATED : March 19, 1991
INVENTOR(S) : MINORU KAWANO et al.

It is certified that error appears in the above-identified patent and that said Letters Patent is hereby corrected as shown below:

On Title Page: Title, change "DOCUMENT CONVEYANCE APPARATUS WITH RETRACTABLE AUXILIARY CONVEYANCE ROLLER" to --DOCUMENT CONVEYANCE APPARATUS FOR USE WITH IMAGE FORMING DEVICES--;

In the Abstract, Line 3 after "including" delete " ; ";

In the Abstract, Line 5, after "roller" delete " , ";

In the Abstract, Line 5, after "glass" insert -- , --;

In the Abstract, Line 22, change "contract" to --contact--.

Signed and Sealed this

Twelfth Day of January, 1993

Attest:

DOUGLAS B. COMER

*Attesting Officer*      *Acting Commissioner of Patents and Trademarks*